United States Patent [19]
Park et al.

[11] Patent Number: 5,687,020
[45] Date of Patent: Nov. 11, 1997

[54] IMAGE PROJECTOR USING ACOUSTO-OPTIC TUNABLE FILTER

[75] Inventors: Sung-soo Park, Kyungki-do; Sang-hak Lee, Seoul, both of Rep. of Korea

[73] Assignee: Samsung Electronics Co., Ltd., Kyungki-do, Rep. of Korea

[21] Appl. No.: 673,204

[22] Filed: Jun. 27, 1996

[30] Foreign Application Priority Data

Jun. 29, 1995 [KR] Rep. of Korea ............... 95-18108

[51] Int. Cl.⁶ ............................................. G02F 1/33
[52] U.S. Cl. ............... 359/309; 359/305; 359/308; 359/285; 359/202; 348/766; 348/760
[58] Field of Search ............... 359/285, 286, 359/305, 308, 309, 311, 202, 216, 217; 250/216; 356/400; 348/766, 762, 760

[56] References Cited

U.S. PATENT DOCUMENTS

| | | | |
|---|---|---|---|
| 4,084,182 | 4/1978 | Maiman | 348/760 |
| 4,348,080 | 9/1982 | Funato | 359/285 |
| 4,400,740 | 8/1983 | Traino et al. | 359/305 |
| 4,611,245 | 9/1986 | Trias | 348/766 |
| 4,685,147 | 8/1987 | Honjo | 359/305 |
| 4,842,394 | 6/1989 | Buchroeder . | |
| 4,942,525 | 7/1990 | Shintani et al. . | |
| 5,130,838 | 7/1992 | Tanaka et al. | 359/305 |

FOREIGN PATENT DOCUMENTS

| | | |
|---|---|---|
| 0211596 | 7/1986 | European Pat. Off. . |
| WO/8501175 | 8/1984 | WIPO . |

*Primary Examiner*—Loha Ben
*Attorney, Agent, or Firm*—Leydig, Voit & Mayer, Ltd.

[57] ABSTRACT

A high definition image projector is provided for modulating light using an acousto-optic tunable filter according to image signals and projecting the modulated light on a screen. An image is obtained by modulating a light beam by pixel units according to the image to be displayed and directly projecting the modulated light beam on the screen in corresponding pixel units. High quality images can thus be displayed on a large screen. By adopting a high-output light source, a high luminance image can be obtained.

10 Claims, 3 Drawing Sheets

IMAGE PROJECTOR USING ACOUSTO-OPTIC TUNABLE FILTER

BACKGROUND OF THE INVENTION

The present invention relates to a high definition image projector for modulating light using an acousto-optic tunable filter (AOTF) according to an applied image signal and projecting the modulated light onto a screen.

General image displaying means include planar display devices such as a cathode-ray tube (CRT) or liquid crystal display (LCD) used for a television. As such display devices become larger, however, their implementation becomes increasingly difficult due to difficulty in manufacture and a decrease in definition. An image projector, on the other hand, overcomes such problems by amplifying an image using an optical system and projecting the amplified image onto a CRT or LCD screen.

There are two ways to project a color image in such an image projector: 1) by individually projecting red, green and blue images and overlapping them on a screen, using two CRTs or three lenses (see U.S. Pat. No. 4,942,525); or 2) by synthesizing the individual images from three CRTs and then projecting one image via a single lens onto a screen (U.S. Pat. No. 4,842,394).

In such a projector for lens-amplifying the image from a CRT or LCD and displaying it on a large screen, the definition of the projected image is lowered through the amplification process. A further problem is that luminance is low since the output of a light source is limited by temperature considerations of the image display.

To overcome such drawbacks, a known image projecting method employs three lasers as a light source, whose respective wavelengths are 600 nm (red), 500 nm (green) and 400 nm (blue) (see European Patent No. 0,211,596 A2). Here, light is independently modulated with three acousto-optic modulators corresponding to the image signals in each wavelength. The individually modulated images (red, green and blue) are overlappingly projected onto a screen. However, since three light sources and three optical modulators are required in a system adopting such a method, the system is undesirably large and expensive.

SUMMARY OF THE INVENTION

To solve the above problems, it is an object of the present invention to provide an image projector which can provide a large image of high definition and high luminance along with a simple structure and lower price.

Accordingly, to achieve the above object, there is provided an image projector using an acousto-optic tunable filter. The image projector includes an image signal generating means for generating optical image signals to be projected on a screen in a beam; and light scanning means for scanning the beam-type image signals horizontally and vertically on the entire screen, wherein the image signal generating means comprises: parallel light generating means for generating parallel white light; optical modulating means for modulating the parallel white light into optical image signals of a predetermined color according to electrical image signals; and image signal providing means for providing the electrical image signals to the optic modulating means.

It is preferred in the image projector of the present invention that the acousto-optic tunable filter outputs visible rays of wavelengths 400–700 nm as the optical image signals by modulating the white light. It is preferred in the image projector of the present invention that the acousto-optic tunable filter is made using a $TeO_2$ crystal and a $LiNbO_3$ crystal as an acousto-optic medium and a convertor, respectively.

It is preferred in the image projector of the present invention that the two rotatable optical polygon comprises a horizontal rotatable optical polygon for latitudinally moving the scanning path of the optical image signal beam; and a vertical rotatable optical polygon for longitudinally moving the scanning path of the optical image signal beam.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
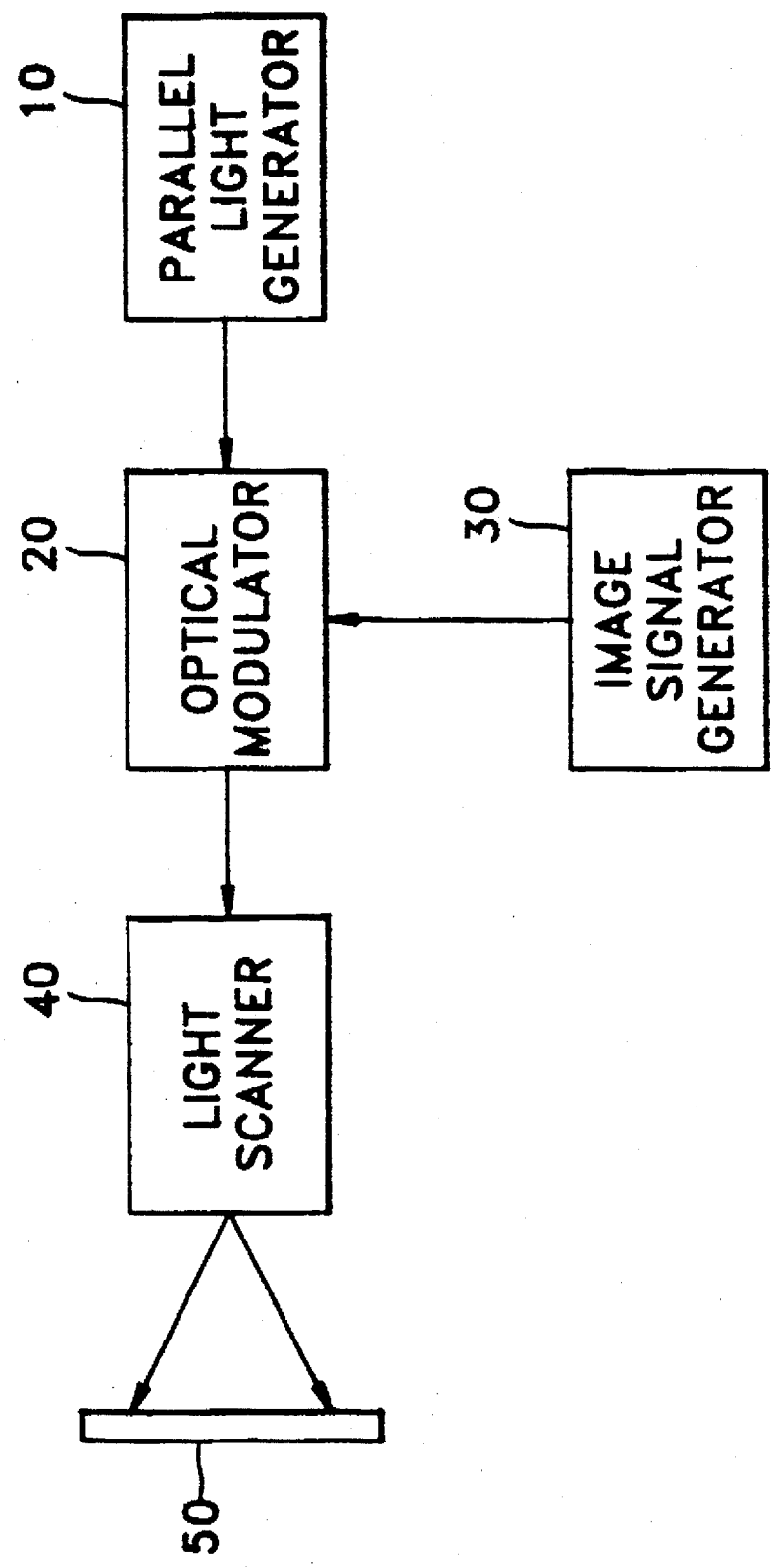
FIG. 1 is a schematic block diagram illustrating an image projector according to the present invention.

FIG. 1 schematically shows a configuration of an image projector for explaining an image projecting method according to the present invention. As shown in the drawing, the image projector of the present invention includes an image signal generating means comprising a parallel light generator 10, an optical modulator 20 and an image signal generator 30, and a light scanning means comprising a light scanner 40 and a screen 50.

In the image signal generating means, the parallel light generator 10 generates a beam of white light needed for image signal generation. The optical modulator 20 modulates the beam of the white light generated by the parallel light generator 10. The image signal generator 30 provides electrical image signals to the optical modulator 20 for optical modulation of the white light as red, green and blue optical image signals.

Also, in the light scanning means, the light scanner 40 sequentially and continuously scans the modulated beam by pixel units on the screen 50 to form a desired image.

Figure 2:
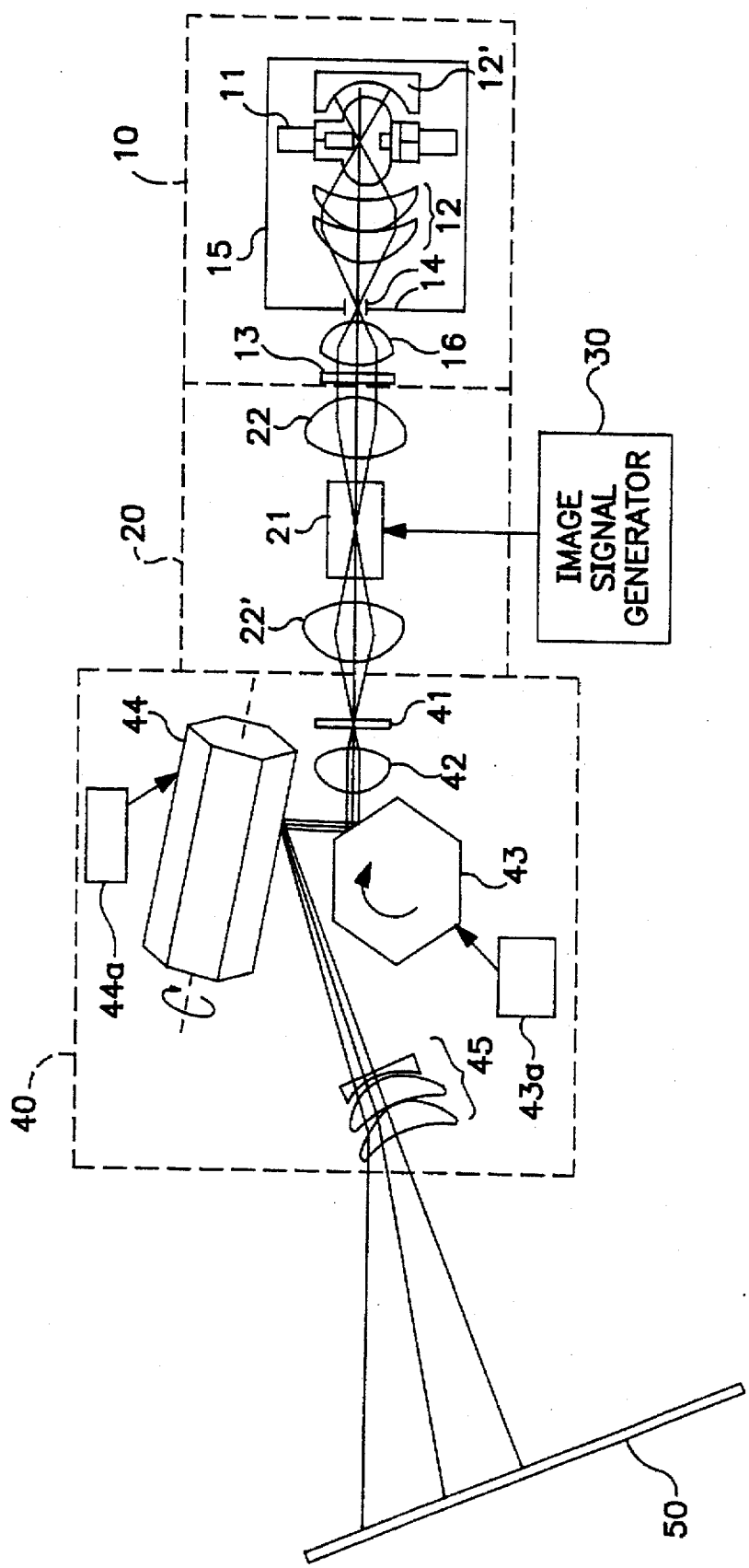
FIG. 2 is a view showing a configuration of an optical system of the image projector of FIG. 1.

A preferred embodiment of an image projector of such a structure will be described in detail, referring to FIG. 2.

The parallel light generator 10 comprises a light source 11 for generating white light; and a focusing/reflecting mirror 12' for focusing and reflecting light emitted from the light source 11. A focusing lens 12 is provided for focusing a beam generated by the light source 11. A cooler (not shown) is provided for cooling the heat-producing light source 11 by completely enclosing the focusing lens 12 and the focusing/reflecting mirror 12' and the light source 11. Housing 15 includes a minute pin hole 14 situated at a focal point of the front focusing lens 12. A collimating lens 16 having a focal point at the pin hole 14 is provided for collimating the light passing through the pin hole 14. A polarizer 13 is provided downstream from the collimating lens 16 for selectively producing linearly polarized light from the collimated light.

In the parallel light generator 10 of such a structure, light generated from the light source 11 focused by means of the focusing lens 12 passes through the fine pin hole 14 so its aberration is reduced. The method of reducing aberration by passing a small light spot through the minute pin hole is well known as a spatial filtering method. The light passing through the pin hole 14 can be regarded as a point light source, and parallel light is emitted from the collimating lens 16 having its focal point at the pin hole 14. Then, the parallel light passes through the polarizer 13 and linearly polarized. The linearly polarized light is input to the optical modulator 20.

The optical modulator 20 comprises an acousto-optic tunable filter (AOTF) 21 for separating the white light into red, green and blue light, and two convergent lenses 22 and 22'. The convergent lens 22 is positioned upstream from the AOTF 21 for focusing the parallel light from the collimating lens 16 at the AOTF 21 in order to increase the optical modulating efficiency of the AOTF 21. When the parallel light is input to the AOTF 21, being fully concentrated, the rise and fall times of the light waveform are shortened during the modulation of the white light into red, green, and blue light. Thus, optical modulation efficiency and scanning speed is increased.

Figure 3:
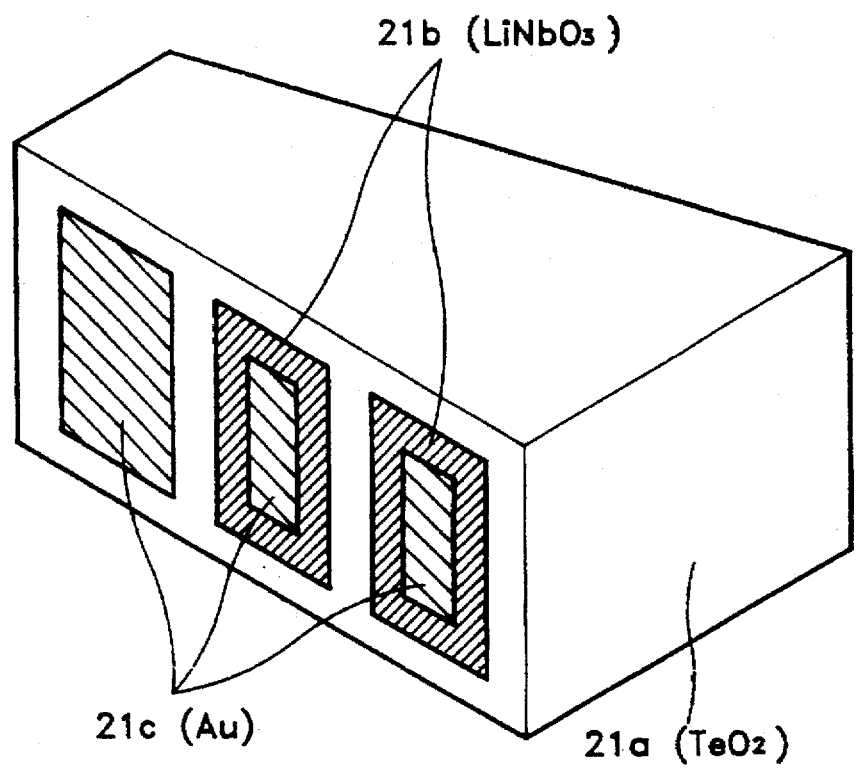
FIG. 3 is a perspective view illustrating a schematic structure of an acousto-optic tunable filter shown in FIG. 2.

The convergent lens 22' is disposed downstream from the AOTF 21 for converging the modulated light output from the AOTF 21 on the light scanner 40. The AOTF 21 modulates white light into red, green, and blue light according to electrical image signals applied from the image signal generator 30. As shown in FIG. 3, the AOTF 21 is uses an TeO$_2$ crystal 21a as an acousto-optic medium and LiNbO$_3$ crystal 21b as a transducer. To filter the wavelengths corresponding to red, green, and blue light into visible light having wavelengths of 400-700 nm, the transducer is designed and manufactured to maintain a superior operation feature within the oscillation range of 45-100 Mhz. Here, a reference numeral 21c is a gold electrode to which the electrical image signals from the image signal generator 30 are applied. The AOTF 21 filters light having a particular wavelength in the white light according to the frequency of acousto-elastic wave by interaction of the white light and a elastic wave. Here, the transducer of the AOTF 21 which generates the acousto-elastic wave divides 650 nm, 550 nm and 450 nm wavelength at frequencies of about 50 MHz, 70 MHz and 95 MHz, respectively.

The image signal generator 30 provides the elastic image signals applied to drive the AOTF 21. The electrical image signals required for the light modulation are easily provided from a conventional video receiver which generates an inherent frequency according to the color of each pixel. Here, the video receiver applies to the AOTF 21 the electrical image signals modulated at a particular frequency for forming each pixel on the screen.

Figure 4:
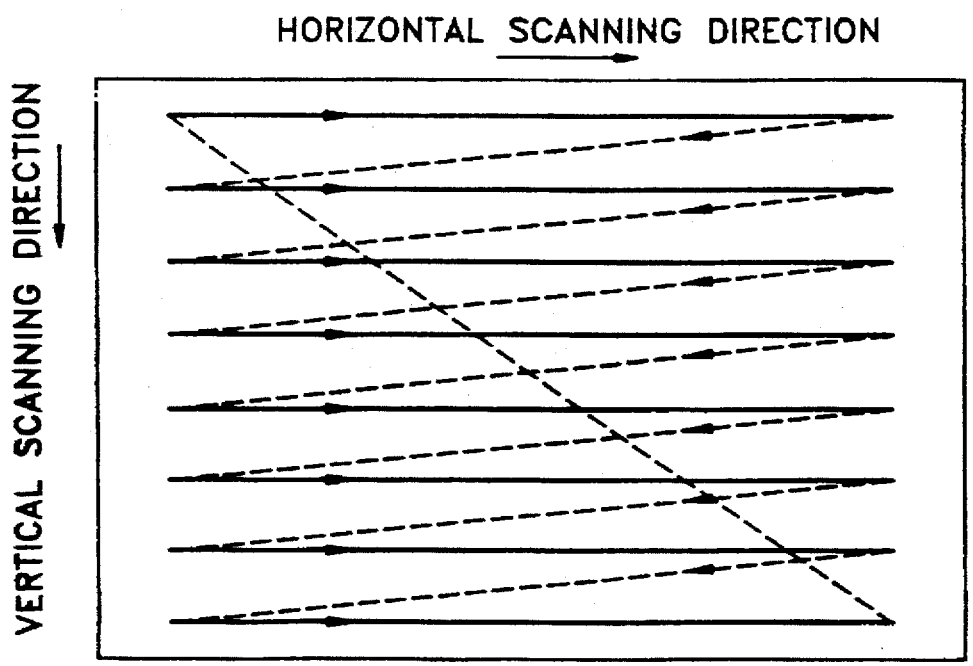
FIG. 4 is a front view of a screen of the image projector on which an image is displayed.

The light scanner 40 comprises a pin hole 41 situated at a focal point of the light modulated by the optical modulator 20. A collimating lens 42 is disposed downstream from the pin hole 41 for collimating the beam passing through the pin hole 41. Two rotatable optical polygons 43 and 44 are disposed downstream from the collimating lens 42 for periodically changing a scanning path to scan the parallel light from the collimating lens 42 in vertical and horizontal directions on the entire surface of a screen 50. A scanning lens 45 transfers the beam with the varying scanning path to the screen 50. Here, the convergent lens 22' and the pin hole 41 act as a spatial filter for removing aberration, and the collimating lens 42 forms a narrower parallel beam for high resolution. Also, the two rotatable optical polygons 43 and 44 rotate at high speeds driven by actuators 43a and 44a, respectively. The rotatable optical polygons 43 and 44 are rotated at a mutually synchronized rotation speed which is determined by the velocity of the elastic wave inside the TeO$_2$ crystal in the AOTF 21 and the distance between the AOTF and the rotatable optical polygon 43. That is, as shown in FIG. 4, the light beam travels horizontally (a first scanning direction) due to a horizontal rotatable optical polygon 43 and vertically (a second scanning direction) due to a vertical rotatable optical polygon 44, to complete the scanning on the entire surface of the screen. The scanning lens 45 directs the beam having a varying scanning path according to the rotatable optical polygons 43 and 44 as a uniform spot at positions on the screen 50. The scanning lens 45 includes a plurality of convex and concave lenses and is an f$\theta$ lens for correction of chromatic aberration of red, green, and blue light. For example, to scan an image on a screen having a width of 60 cm or more, a combination of one concave lens and two convex lenses is used and, here, the diameter of a spot on the screen is about 1 mm. A color image signal of one frame is obtained by sequentially scanning red, green, and blue images at 60 Hz (or 30 Hz), which results in a mixture of three colors (a mixture effect due to an afterimage). Namely, by sequentially scanning red, green and blue beams at 60 Hz in one frame, a color image of one complete frame is obtained.

As described above, in the image projector according to the present invention, an image is obtained by modulating a light beam in pixel units according to the image to be displayed and directly projecting the modulated light beam on the screen by corresponding pixel units, without using a conventional image display such as a CRT or LCD. Thus, it is possible to display a high quality image on a large screen, and a high-luminance image can be obtained by adopting a high-output light source.

What is claimed is:

1. An image projector comprising:
    image signal generating means for generating optical image signals, said image signal generating means including a parallel light generator for generating parallel white light comprising:
        a light source for generating white light;
        light focusing means for focusing the white light;
        a pin hole for removing aberration from the white light focused by said light focusing means;
        a collimating lens for collimating the white light passing through the pin hole; and
        a polarizer for selectively passing linearly polarized light of the white light collimated by said collimating lens;
    image signal providing means for generating electric image signals;
    means for modulating the white light to produce optical image signals corresponding to respective colors, in response to the electric image signals; and
    light scanning means for scanning the optical image signals in two orthogonal directions.

2. The image projector according to claim 1, wherein the light focusing means includes:
    a concave reflecting mirror for focusing and forwardly reflecting back light emitted from said light source; and
    a focusing lens for focusing light emitted from said light source to said first pin hole.

3. An image projector comprising:
    image signal generating means for generating optical image signals including:
        a parallel white light generator for generating parallel white light;

image signal providing means for generating electric image signals; and means for modulating the white light to produce optical image signals corresponding to respective colors, in response to the electric image signals, comprising:

an acousto-optic tunable filter for converting the parallel white light into red, green, and blue optical image signals, in response to the electric image signals;

a first convergent lens for focusing the parallel white light on said acousto-optic tunable filter; and a second convergent lens for focusing the optical image signals; and light scanning means for scanning the optical image signals.

4. The image projector according to claim 3, wherein said acousto-optic tunable filter outputs visible light having wavelengths of 400–700 nm as the optical image signals by modulating the parallel white light.

5. The image projector according to claim 4, wherein said acousto-optic tunable filter includes a $TeO_2$ crystal and a $LiNbO_3$ crystal as an acousto-optic medium and a convertor, respectively.

6. The image projector according to claim 3, wherein said light scanning means comprises:

a pin hole located at a focal point of said second convergent lens in said image signal generating means;

a collimating lens for collimating the optical image signals passing through said pin hole into a parallel light beam; and first and second rotatable optical polygons for periodically changing a scanning path of the parallel light beam emitted from said collimating lens to scan the parallel light beam on a screen.

7. The image projector according to claim 6, wherein said first and second rotatable optical polygons include:

a horizontally rotatable optical polygon for latitudinally moving the scanning path of the parallel light beam emitted from said collimating lens; and a vertically rotatable optical polygon for longitudinally moving the scanning path of the parallel light beam emitted from said collimating lens.

8. The image projector according to claim 7, further comprising means for rotating said first and second rotatable optical polygons at a mutually synchronized rotation speed determined by a velocity of an elastic wave inside the $TeO_2$ crystal in said acousto-optic tunable filter and a distance between said acousto-optic tunable filter and one of the first and second rotatable optical polygons.

9. The image projector according to claim 6, further comprising a scanning lens group, located downstream from said first and second rotatable optical polygons and upstream from a screen to focus the optical image signals having a varying scanning path on the screen.

10. The image projector according to claim 9, wherein said scanning lens group includes a lens system for aberration correction of red, green, and blue light, the lens system including a plurality of concave and convex lenses.

* * * * *